(12) United States Patent
Cherix et al.

(10) Patent No.: US 8,074,968 B2
(45) Date of Patent: Dec. 13, 2011

(54) CABLE LAYING DEVICE

(75) Inventors: Michel Cherix, Troistorrents (CH); Patrice Blanchet, Leytron (CH)

(73) Assignee: Plumettaz S.A., Bex (CH)

( * ) Notice: Subject to any disclaimer, the term of this patent is extended or adjusted under 35 U.S.C. 154(b) by 355 days.

(21) Appl. No.: 12/441,966

(22) PCT Filed: Oct. 4, 2007

(86) PCT No.: PCT/CH2007/000488
§ 371 (c)(1),
(2), (4) Date: Mar. 19, 2009

(87) PCT Pub. No.: WO2008/040140
PCT Pub. Date: Apr. 10, 2008

(65) Prior Publication Data
US 2009/0236575 A1    Sep. 24, 2009

(30) Foreign Application Priority Data
Oct. 6, 2006 (CH) .................................... 1593/06

(51) Int. Cl.
*B65H 59/00* (2006.01)

(52) U.S. Cl. ............................... 254/134.4; 254/134.3 R
(58) Field of Classification Search ............... 254/134.4, 254/134.3 R; 226/91, 25, 43, 178; 29/244
See application file for complete search history.

(56) References Cited

U.S. PATENT DOCUMENTS

| | | | |
|---|---|---|---|
| 4,412,672 A * | 11/1983 | Zelins | 254/134.3 R |
| 5,169,126 A | 12/1992 | Reeve et al. | |
| 5,749,565 A * | 5/1998 | Frost et al. | 254/134.4 |
| 6,386,512 B1 * | 5/2002 | Pecot et al. | 254/134.4 |

FOREIGN PATENT DOCUMENTS

| | | |
|---|---|---|
| EP | 0292037 A1 | 11/1988 |
| WO | 95/23988 A1 | 9/1995 |

* cited by examiner

*Primary Examiner* — David B Thomas
(74) *Attorney, Agent, or Firm* — Harness, Dickey & Pierce, PLC

(57) ABSTRACT

The laying device of a slender element in a tube comprises on the one hand an introduction cassette and on the other hand a driving body, these two elements being able to be mounted independently around the slender element to be laid, then joined to form said laying device. This makes installation of said device in a laying site easier.

13 Claims, 4 Drawing Sheets

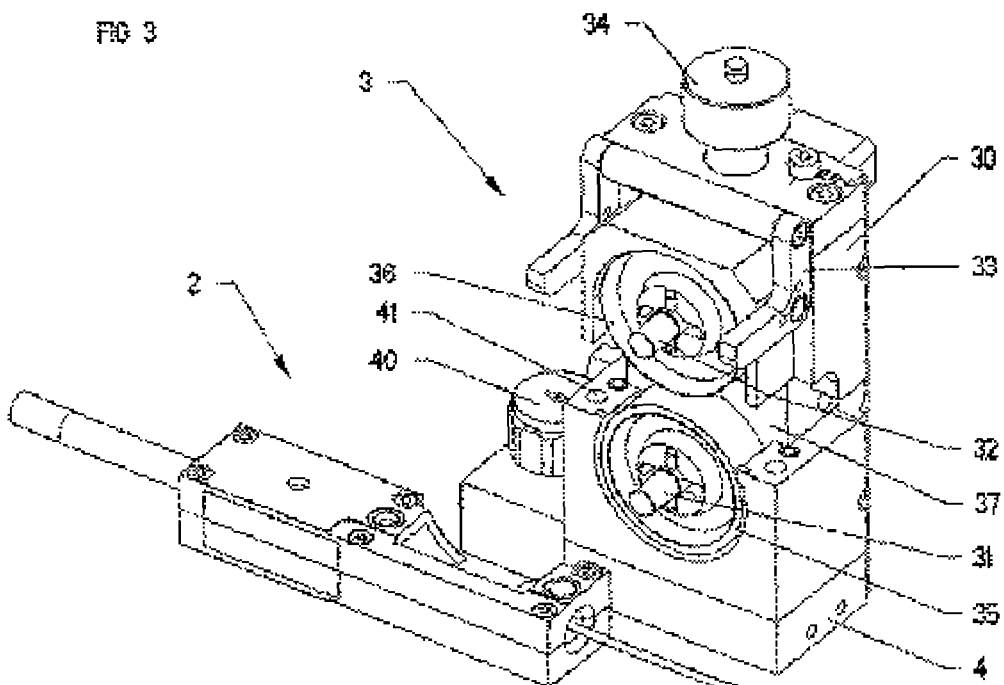
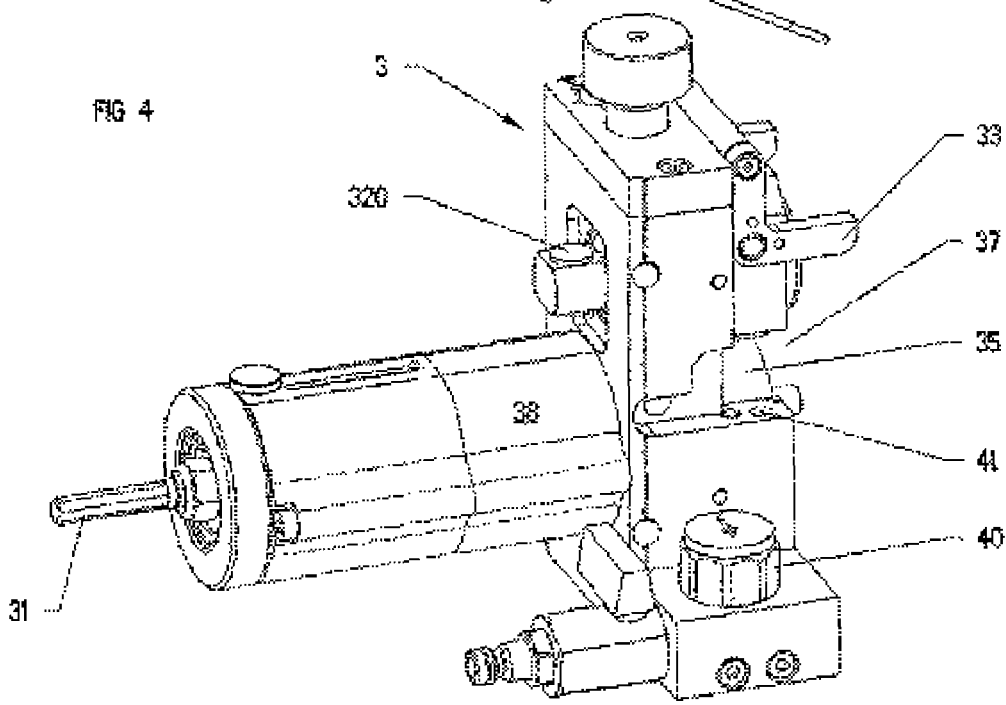

CABLE LAYING DEVICE

FIELD

The present invention relates to a device used for laying cables or other slender elements, especially for small-diameter cables or elements and more especially optical fibre cables laid according to the pushing technique or the pushing-carrying technique.

BACKGROUND

Laying a cable in a tube according to this latter technique generally takes place by injecting a fluid into the tube, the fluid being injected at a speed higher than the laying speed of the cable, mechanical means arranged upstream of the fluid injection being provided for pushing the cable inside the tube. It is common to lay cables using this technique, especially very long optical fibre cables.

However, this technique suffers from a drawback resulting from the required space and the mass of the device including means allowing injection of the carrier fluid as well as means for pushing. This drawback is especially obvious during laying where the introduction site of the cable is located in a confined space or when the tube end, able to receive the cable, terminates very close to a side wall of the introduction chamber, or during laying of small-diameter optical fibre cables and relatively fragile cables.

The device described in document U.S. Pat. No. 5,749,565 describes such a device especially unsuited to laying when the tube which should receive the optical fibre is close to the left wall of the introduction chamber.

SUMMARY

In order to avoid this drawback, the invention provides a laying device for laying a cable or other slender element, such as described in claim 1, alternatives or other embodiments being described in the dependent claims.

DRAWINGS

Figure 1:
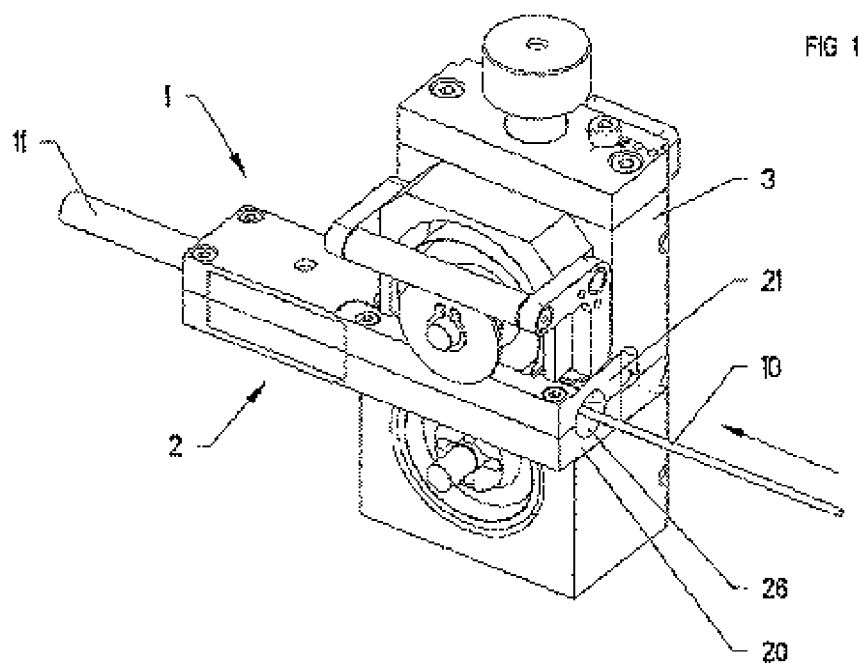
Figures 7A, 7B:
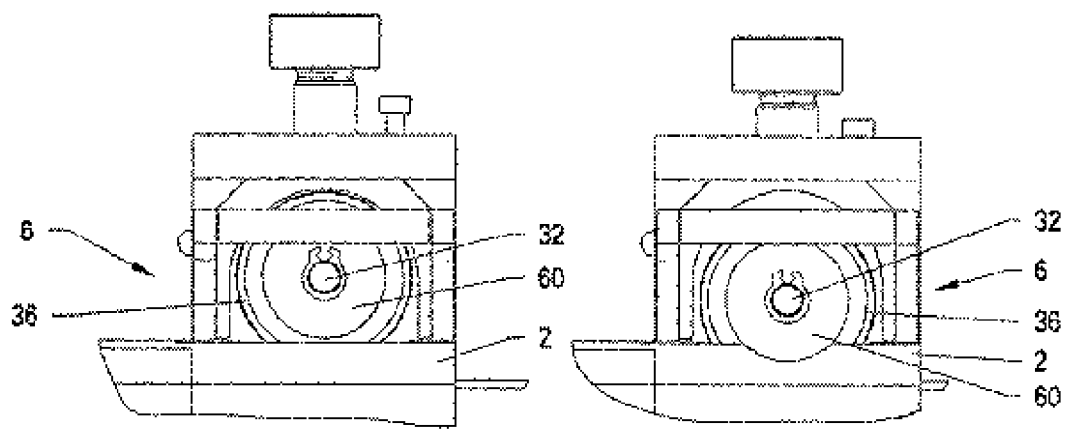
Figure 2:
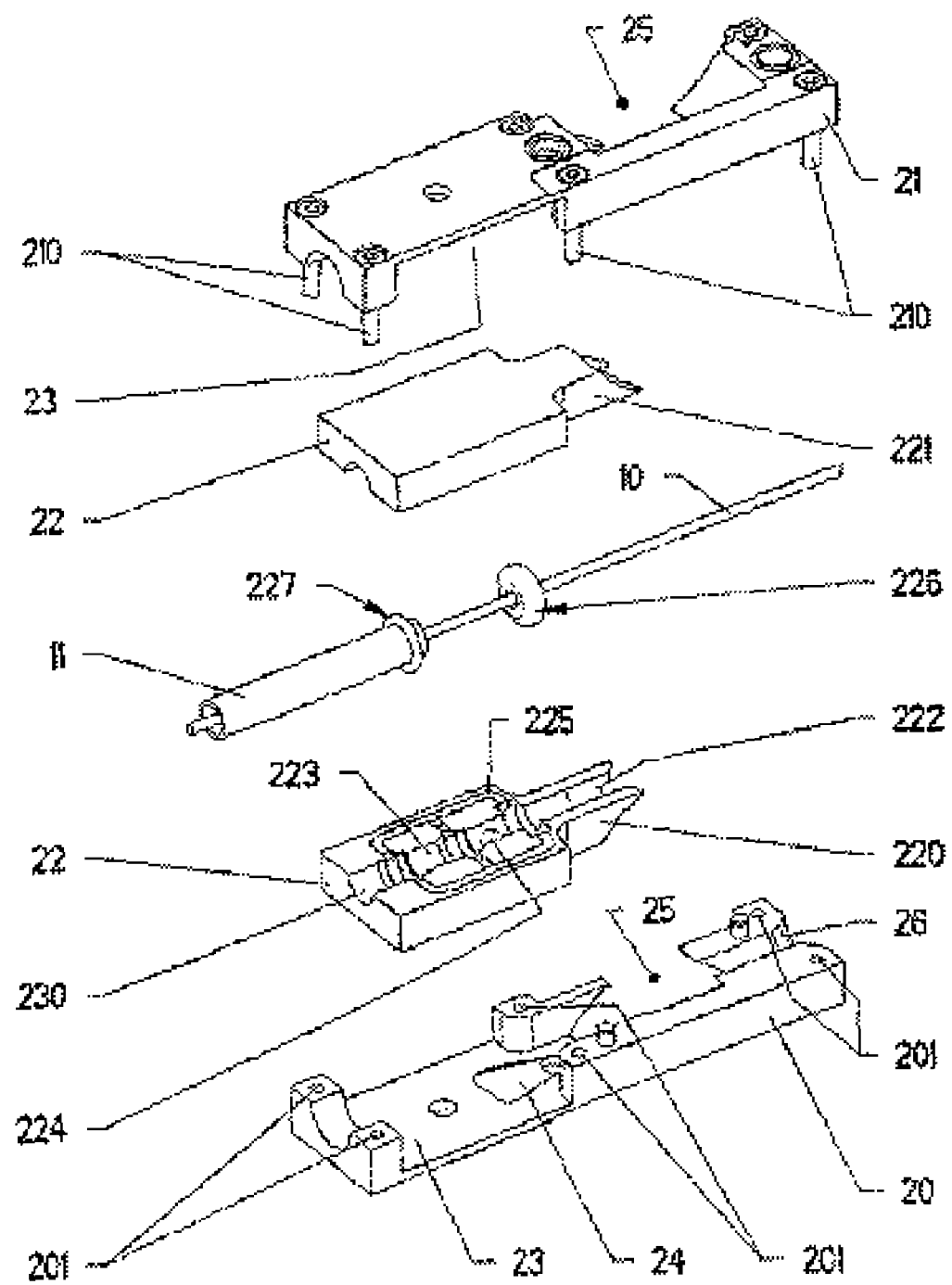
Figure 5:
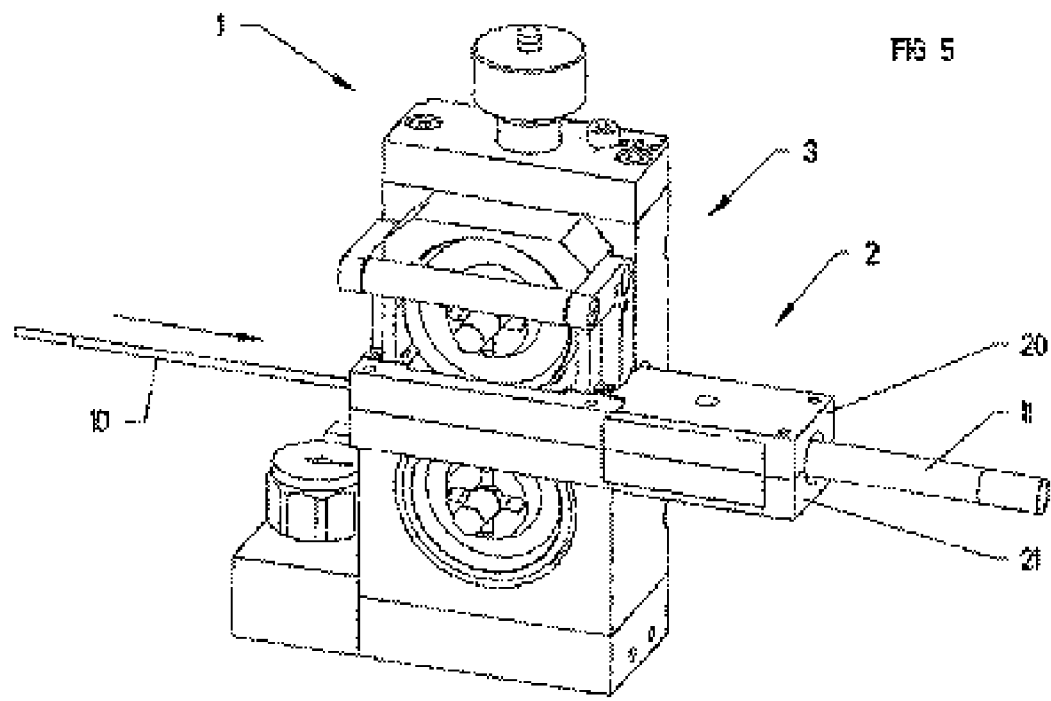
Figure 6:
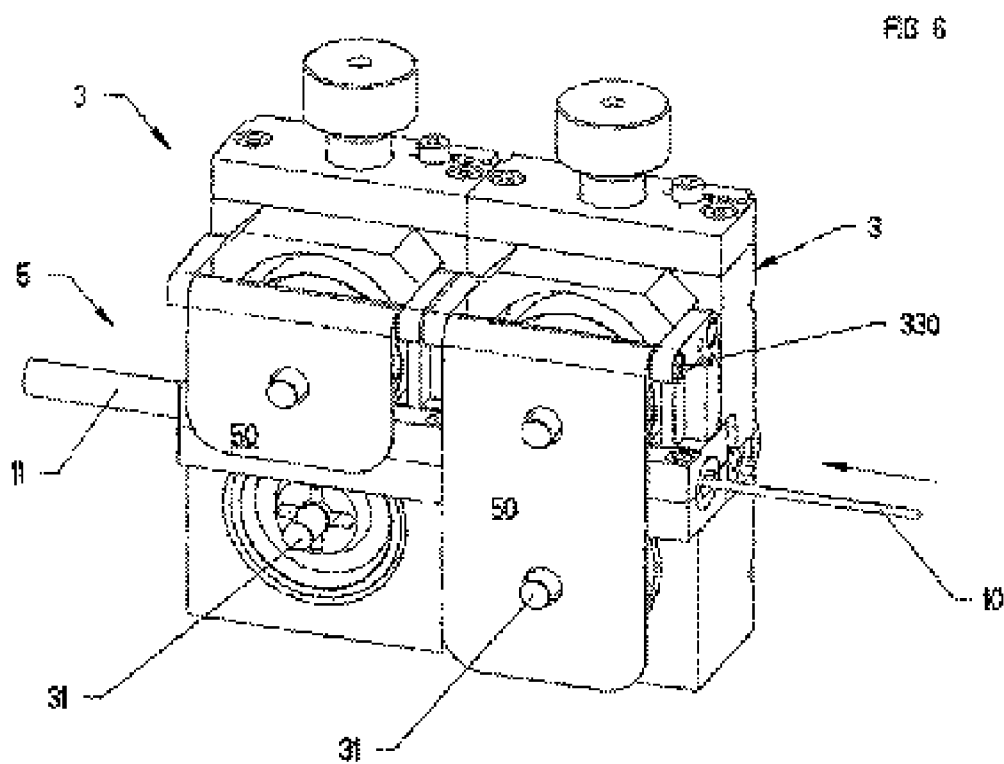

A preferred embodiment of a device according to the invention is described below, together with the description of some alternative embodiments, with reference to the attached drawings, in which:

FIG. 1 illustrates a perspective view of a laying device according to the invention in an operational position according to a first arrangement, FIG. 2 illustrates an exploded view of the various constituting elements of an introduction cassette, FIG. 3 illustrates a perspective view of the same device as that of FIG. 1, the introduction cassette being separated from the driving body, FIG. 4 illustrates a rear view of the driving body, FIG. 5 illustrates the same device as that of FIG. 1 according to another arrangement, FIG. 6 illustrates a device including two driving bodies, and FIGS. 7A and 7B illustrate a safety pull-out device provided on the driving body.

DETAILED DESCRIPTION

FIG. 1 illustrates a laying device according to the invention 1, intended to lay a cable or another element 10, here an optical fibre, in a tube 11. The optical fibre 10 comes from a drum or other storage device, not illustrated in the figure, and is introduced via the port 26 and is pushed into the tube 11 in the arrow direction by the laying device 1.

The laying device 1 according to the invention consists essentially of an introduction cassette 2 and a driving body 3.

The introduction cassette 2 comprises a first portion 20 and a second portion 21, both said portions being joined for laying, as seen in the figure 1.

FIG. 2 shows in detail the constitution of an introduction cassette 2. This introduction cassette 2 essentially comprises four elements: a first portion 20, a second portion 21, an insert 22 comprising a bottom section 220, and a top section 221.

Starting with the insert 22 and its bottom section 220, we can see that the latter comprises a longitudinal groove portion 222 used for guiding the fibre 10 at the inlet of the insert 22. The other side of the bottom section 220 comprises a housing 230 for receiving and attaching the end of the tube 11. The diameters of the groove 222 as well as of the housing 230, which should receive the tube 11, are selected according to the intrinsic diameters of the fibre and the tube 11.

Given that in some laying instances, a fluid is injected under pressure into the tube 11 simultaneously with introduction of the fibre, the insert 22 comprises a fluid introduction chamber, a portion 223 of which is visible in the figure. This fluid introduction chamber 223 is arranged between the groove portion 222 and the housing 230, these three elements being aligned according to the longitudinal axis of the insert 22. The fluid introduction chamber 223 is connected via a port 224 to a fluid supplying chamber 24 recessed in the first portion 20 of the introduction cassette 2. Tightness against fluid leaks is provided by a string seal 225 arranged in a peripheral groove of the fluid introduction chamber 223, as well as by a lip seal 226 providing leak tightness on the fibre side and by an O-ring 227 providing leak tightness on the tube side, these three seals being arranged in adapted housings of the bottom section 220.

The top section 221 of the insert 22 is similar to the bottom section 220 that has just been described, except that it has no port 224 allowing communication between the fluid introduction chamber and the exterior and that housings are provided only for the seals 226 and 227.

The two portions 20 and 21 of an introduction cassette 2 are similar, except that one of the portions, for example the second portion 21 comprises mounting rods 210, whereas the first portion 20 comprises corresponding blind holes 201. Each of the portions 20 and 21 comprises a portion of a housing 23 for receiving the insert 22 when assembled.

When the two portions 20 and 21 of the introduction cassette 2 are assembled, the latter presents an undercut or a side recess 25 upstream from the housing 23 over a portion of the length of the cassette 2 allowing coupling and operating of the driving body 3, as seen below. Also, the introduction cassette 2 presents an introduction opening 26 communicating directly with the groove 222 of the insert 22.

FIG. 3 shows in detail the constitution of the driving body 3 according to a particular embodiment, arranged near an introduction cassette 2. This driving body 3 comprises a frame 30 and two parallel axes 31 and 32, the axis 31 extending to the rear of the body 3, as seen in FIG. 4, for receiving rotating driving means which will be described later. The axis 32 is mounted slidingly on a moving portion, so that the distance between the axes 31 and 32 can be adjusted by the set screw 34 according to the diameter of the cable or the element to be laid, so that the axis of the element to be laid remains approximately coaxial to the longitudinal centre axis of the device. Each of the axes 31 and 32 carries a wheel 35, respectively 36. The wheel 35, directly driven by the engine-powered axis 31 is a drive wheel, whereas the wheel 36 acts as a support wheel. One or each of said wheels can carry a relatively soft peripheral tire, ensuring integrity of the cable or the element to be laid, said tire being able to carry a peripheral groove adapted to the diameter of the element to be laid. Preferably, each of the wheels 35, 36 is mounted on its respective axis so as to be changed quickly.

The body 30 of the driving body 3 comprises an open housing 37, arranged between the two wheels 35 and 36 and intended to receive the introduction cassette 2.

FIG. 3 illustrates a cassette-locking lever 33, illustrated here in a raised position and the use of which will be described below.

This figure, however, shows a carrier fluid supplying device 4 attached under the driving body 3 and able to include a pressure gauge 40. This device is connected from one side to a fluid supplying unit, not illustrated in the figures, and on the other hand to a duct 41 crossing the bottom part of the frame 30 to open onto an open port in the housing 37. When the driving body 3 is mounted on the introduction cassette 2, as seen in FIG. 1, the port of the duct 41 is communicating with the fluid supplying chamber 24 recessed in the first portion 20 of the introduction cassette 2, connected itself, as mentioned hereinabove, to the port 224 of the fluid introduction chamber 223, thereby allowing injection of the carrier fluid into the tube 11.

FIGS. 1, 2 and 3 show a first advantage of the laying device 1 according to the invention relative to known devices from the prior art. It is evidently possible to first join the two sections 20 and 21 of the insert 2 by laying the fibre 10 provided with the seal 226 in the groove 222, as well as the end of the tube 11 provided with the seal 227 in its housing 230 of the bottom portion 20, then superimposing the top portion 21 in order to constitute the insert 22. The two portions 20 and 21 of the introduction cassette 2 are assembled around this insert 22. This operation involving only light and space-saving material can be carried out easily in any inconvenient and barely accessible place. The constituting elements of the introduction cassette 2 are preferably made of light metal, for example aluminium.

Once this initial operation is completed, the driving body 3 is inserted around the introduction cassette 2, so that the wheels 35 and 36 are arranged on each side of the cable or the slender element 10 to be laid in the undercut 25, then the distance between the axes 31 and 32 is adjusted, respectively between the wheels 35 and 36 according to the diameter of the cable or the element 10 to be inserted in the tube 11, in order to complete the laying device 1, as seen in FIG. 1. The locking lever 33 is lowered, thus fixing the cassette 2 in the driving body 3.

FIG. 4 shows a driving body 3 viewed from its rear face and showing a detail of the rotating driving means of the axis 31. This axis 31, carrying on one side the driving wheel 35, as described above, extends on the other side of the driving body and can advantageously carry a torque limiter 38, adjustable or fixed, for limiting the torque transmitted to the wheel 35, respectively to the fibre during laying. Any appropriate rotating driving means coming out of the torque limiter 38 can be mounted on this axis 31; this means, not illustrated in the figure, can be a manual or powered, pneumatic, hydraulic or electrical drive, for example a power electric drill connected to the axis 31, this rotating driving means able to further comprise a reversing device, a reduction device or an angle transmission device.

FIG. 4 shows in particular that the rotating driving means occupy considerable space on the rear side of the driving body 3.

Another determining advantage of the laying device 1 according to the invention is visible in comparing FIGS. 1 and 5. FIG. 1 shows that the undercut 25 of the introduction cassette 2, visible in FIG. 2, is arranged for receiving the driving body 3 from the right of the cassette, according to the path direction of the fibre, the driving means then being arranged on the right side. On the other hand, in FIG. 5, since the introduction cassette 2 is symmetrical with respect to the face separating its two portions 20 and 21, it has been mounted so that the driving body 3 is arranged on the left side with respect to the path direction of the fibre, the driving means thus also being arranged on this side. In this way, if the tube 10 which should receive the fibre is arranged close to the left wall of the introduction chamber, the laying device 1 will be mounted as illustrated in FIG. 1, i.e. with the rotating driving means on the right, whereas if this tube 10 is arranged close to the right wall of the introduction chamber, the laying device 1 will be mounted as illustrated in FIG. 5, i.e. with the rotating driving means on the left.

FIG. 4 again shows means for measuring the velocity and the laying length, comprising a permanent magnet 320 mounted off-centre on one of the axes, here the axis 32. Coupled to a corresponding sensor as well as a measuring electronic unit, not illustrated in the figure, this measuring means continuously controls the velocity as well as the length of the laid fibre or cable. The measuring unit can be arranged directly on the laying device 1 or transferred remotely.

Alternative embodiments of the introduction cassette 2 as well as the driving body 3 could be contemplated, some of these alternatives not illustrated in the figures.

The introduction cassette 2 is illustrated with only one inlet port 26, the insert 22 comprising only one guiding groove 222. Particularly in the case of laying of the optical fibres, there can be one introduction cassette 2 comprising several inlet ports 26, the insert having several grooves 222, all converging to the inlet of the tube 11, so as to deliver simultaneously several optical fibres 11.

Likewise, the laying body 3 has been illustrated with a carrier fluid providing and supplying device 4 on the bottom portion. For some laying cases in which carrier fluid can be dispensed with, this latter device need not be mounted. In some laying cases, only a lubricant can be inserted into the tube 11 simultaneously with the element to be laid 10.

In those cases where it is needed, the carrier fluid can be a dry fluid, for example, dry compressed air or a lubricated fluid, for example compressed air with a lubricant.

For relatively heavy and/or rigid elements to be laid, it is possible to provide an introduction cassette 2 comprising two successive undercuts 25 for receiving two successive driving bodies 3, as illustrated in FIG. 6. Preferably, only one of the axes 31 is directly driven, the other axis 31 being driven via a synchronization belt.

By way of variant, the cassette 2 can comprise a much larger undercut 25, the driving body then comprising two driving tracks instead of the two wheels 35 and 36.

Rather than adjustment of the position of the one axis 31, with respect to the longitudinal centre axis of the device, there can also be symmetrical and simultaneous adjustment means of the gap of the two axes 31 and 32.

FIG. 6 further shows a safety device 5 comprising, in this alternative embodiment of the laying device 1, two louvers 50 folding around an axis, for example an axis 330 of the cassette locking device 33 and suitable for hiding one or both wheels 35, 36 in order to protect the fingers of the user during the laying.

FIGS. 7A and 7B show a pull-out safety device of cassette 6 consisting essentially of a disk 60 mounted at the end of the axis 32. As seen in FIG. 7A, the axis 32 is raised, the disk 60 releasing the path for the introduction or the extraction of the cassette 2. In FIG. 7B, the axis 32 has been lowered for bringing closer the two wheels 35, 36, as mentioned hereinabove for laying the fibre, for this reason lowering the disk 60 in front of the cassette 2, so as to prevent its extraction. This device 6 especially ensures that the two wheels 35, 36 have been moved away from each other before removing the cassette 2, in order not to pull out the fibre during this operation.

Because it is constituted in two separate elements, a laying device according to the invention can therefore be more easily installed, especially in hard-to-access laying work sites. Due to the symmetrical constitution of the introduction cassette 2, the driving body 3 can be mounted from one side or the other of said cassette, so as to be adapted to the layout of the digging or the introduction chamber.

What is claimed is:

1. A laying device of a slender element by introduction in a tube, comprising introduction and guiding means, mechanical thrust means of said slender element into said device, as well as introduction means of said slender element into said tube, the introduction means of said slender element into said tube includes a cassette, whereas the mechanical thrust means are part of a driving body, said cassette and said driving body include two independent elements suitable to be joined for laying said slender element,
wherein:
the cassette, constituted by two similar portions, is symmetrical with respect to a central plane containing the longitudinal axis through which said slender element passes and separating said two portions, said cassette having a side cutout for mounting the driving body, the cassette thus being suitable to be installed on the element to be laid in a first configuration having said side cutout arranged on one side of said element to be laid with respect to a path direction of said element to be laid and in a second configuration having said side cutout arranged on the other side of the element to be laid with respect to the path direction of said element to be laid, the driving body being suitable to be mounted near the cassette where said cutout is located.

2. A laying device according to claim 1, wherein the driving body further comprises carrier fluid providing and supplying means, supplying a fluid supplying chamber arranged in said cassette.

3. A laying device according to claim 2, wherein the cassette comprises an insert having a bottom section and a top section, each of said sections having guiding groove means, tube attachment means, as well as a fluid introduction chamber, only the bottom section having a port suitable for communicating said fluid supplying chamber with said fluid introduction chamber, as well as means ensuring tightness of said fluid introduction chamber.

4. A laying device according to claim 3, wherein the cassette comprises a housing suitable for receiving the insert.

5. A laying device according to claim 1, wherein the cassette comprises several introduction and guiding means allowing simultaneous laying of several elements.

6. A laying device according to claim 1, wherein the driving body comprises a frame comprising two parallel axes arranged perpendicularly to the laying axis, each of said axes carrying a wheel, one of said axes being powered, means for adjusting the pitch of said axes, respectively of said wheels, being provided to adjust the pitch of said wheels to the diameter of the slender element to be laid after said driving body has been joined to the cassette.

7. A laying device according to claim 6, wherein the means for adjusting the pitch of the axes comprise a mobile portion carrying one of the axes, the pitch position of said moving portion being adjustable by screw/bolt means.

8. A laying device according to claim 6, wherein the powered axis carries a torque limiter with an adjustable or fixed torque.

9. A laying device according to claim 6, wherein one of the axes comprises means suitable for providing a pulse for providing an indication of velocity and/or laying length.

10. A laying device according to claim 6, wherein at least one of the driving wheels carries a soft tire.

11. A laying device according to claim 6, further comprising safety means comprising a folding louver suitable for hiding at least one of the rotating wheels.

12. A laying device according to claim 1, further comprising cassette-locking means comprising especially a pivoting lever suitable for locking the cassette when it is installed on the driving body.

13. A laying device according to claim 1, wherein the cassette is suitable for simultaneously receiving two driving bodies arranged one behind the other.

\* \* \* \* \*